United States Patent
Lee

(12) United States Patent (10) Patent No.: US 8,948,579 B2
Lee (45) Date of Patent: Feb. 3, 2015

(54) INFRARED RADIATION COOKER

(76) Inventor: Jin-Hee Lee, Goyang-si (KR)

( * ) Notice: Subject to any disclaimer, the term of this patent is extended or adjusted under 35 U.S.C. 154(b) by 878 days.

(21) Appl. No.: 12/682,247

(22) PCT Filed: Jan. 16, 2009

(86) PCT No.: PCT/KR2009/000244
§ 371 (c)(1),
(2), (4) Date: Apr. 8, 2010

(87) PCT Pub. No.: WO2009/091211
PCT Pub. Date: Jul. 23, 2009

(65) Prior Publication Data
US 2010/0209083 A1    Aug. 19, 2010

(30) Foreign Application Priority Data

Jan. 18, 2008 (KR) .......................... 10-2008-0005830

(51) Int. Cl.
*H05B 6/50* (2006.01)
*A23C 3/02* (2006.01)
(Continued)

(52) U.S. Cl.
CPC ................. *A47J 37/046* (2013.01); *F24C 7/04* (2013.01); *H05B 3/744* (2013.01); *H05B 2203/032* (2013.01)
USPC ........... 392/418; 392/391; 392/407; 392/408; 392/419; 219/711; 219/715; 219/725; 219/729; 219/386; 99/483; 99/451; 99/328; 99/333; 99/357

(58) Field of Classification Search
CPC .... A47J 37/046; F24C 7/04; H05B 2203/032; H05B 3/744
USPC ......... 219/711, 715, 725, 729, 748–749, 386, 219/411; 99/483, 451, 328, 333, 325, 327, 99/339, 357; 392/418, 391, 407–408, 419
See application file for complete search history.

(56) References Cited

U.S. PATENT DOCUMENTS 2,057,421 A * 10/1936 Dickson .......................... 99/353
2,247,626 A * 7/1941 Butler ............................ 219/391
(Continued)

FOREIGN PATENT DOCUMENTS

JP      200719160 A    2/2007
KR  1020020005059 A    1/2002
(Continued)

OTHER PUBLICATIONS

KR-1020050024716.pdf, machine translation.*

*Primary Examiner* — Dana Ross
*Assistant Examiner* — Ket D Dang
(74) *Attorney, Agent, or Firm* — Kile Park Reed & Houtteman PLLC

(57) ABSTRACT

Provided is an infrared radiation cooker in which heat from an infrared lamp is directly applied onto food being grilled, to thus cook the upper and inner parts of the food, as well as onto a rotatable pan, to thus simultaneously cook the lower part of the food. As a result, the food cooks evenly throughout without burning or creating residual odors from above to below as well as from outer to inner, and further the rotatable pan of respectively different structures can be selected depending on an intended cooking purpose, to thereby adjust height of the rotatable pan, which changes a heat intensity, to thus vary a cooking style, and which can be used to boil, grill or roast foods as one would like.

4 Claims, 4 Drawing Sheets

(51) Int. Cl.
*A47J 37/04* (2006.01)
*F24C 7/04* (2006.01)
*H05B 3/74* (2006.01)

(56) References Cited

U.S. PATENT DOCUMENTS 3,714,885 A * 2/1973 Wertheimer et al. ........... 99/425
4,439,459 A * 3/1984 Swartley ........................ 426/438
5,032,699 A * 7/1991 Hu ................................. 219/621
5,404,420 A * 4/1995 Song .............................. 392/416
6,444,966 B2 * 9/2002 Mukumoto et al. ........... 219/749

FOREIGN PATENT DOCUMENTS

KR 1020050035237 4/2005
KR 1020050107359 A 11/2005

* cited by examiner

INFRARED RADIATION COOKER

BACKGROUND OF THE INVENTION

1. Field of the Invention

The present invention relates to infrared radiation cooking appliances and, more specifically, to an infrared radiation cooker in which heat from an infrared lamp is directly applied onto food being grilled, to thus cook the upper and inner parts of the food, as well as onto a rotatable pan, to thus simultaneously cook the lower part of the food, with the result that the food cooks evenly throughout without burning or creating residual odors from above to below as well as from outer to inner, and further the rotatable pan of respectively different structures can be selected depending on an intended cooking purpose, to thereby adjust height of the rotatable pan, which changes a heat intensity, to thus vary a cooking style, and which can be used to boil, grill or roast foods as one would like.

2. Description of the Related Art

As is already known, infrared rays are longer in wavelength than visible light but shorter than microwave rays, falling between 750 μm~1 mm. The classification ranges from far infrared rays which have a longer wavelength, and near infrared rays which have a shorter wavelength.

Infrared rays are invisible to the naked eye and cannot be dispersed by air molecules. They are stronger than visible light rays in measurement of penetration and, as a result, have been used in many industries, especially in communication and medical industries.

As compared to visible light rays and ultraviolet rays, infrared rays emit a high degree of radiant heat, which has led to the development of various heating apparatus and cooking appliances on the market.

One example of an existing infrared ray cooking appliance being Korean Patent Registration No. 0779225 published on Nov. 28, 2007. This infrared ray meat-grill uses a quartz external infrared lamp which is placed under a rotatable pan, and a reflective board under the infrared heating lamp. The infrared lamp in this invention, however, heats the grill pan from below, cooking food from one side alone. The inconvenience being that food must be turn over constantly in order for it to cook evenly top and bottom and, what is more, this appliance cannot be used for boiling.

Another example of a cooking appliance developed using infrared ray technology is Korean Utility-model Registration No. 314605 published on May 27, 2003. This meat roaster has a near-infrared ray lamp over a gridiron grilling pan and a reflective board over the infrared ray lamp. The meat roaster applies infrared rays directly onto meat from the above infrared ray lamp and successfully keeps meats from burning. This appliance does not, however, allow users to adjust the height level and, consequentially, the cooking time of meats by modifying the level of heat intensity. Additionally, the appliance only emits radiant heat from above, cooking on one side alone, providing a less even cooking process and removing the option of boiling meats.

In this way, previous infrared ray cooking appliances do not adequately provide an efficient and even cooking process for grilling foods. And, what is more, they leave users with little control over the cooking time or heat intensity of the cooking process and eliminate the possibility of boiling foods if desired. Due to the inconveniences explained above, the current infrared ray cooking products are not perfectly suited to accommodate the residential or commercial purposes of most individuals. Thus, there has been a long-felt and unsolved need to provide a thorough and efficient infrared ray appliance, which would enable users to simultaneously cook food on both sides at once. Bridging the gap between efficiency and revolutionary technology would allow users to enjoy the health benefits of infrared ray cooking and afford them the time saving benefits it can provide.

SUMMARY OF THE INVENTION

An object of this invention is to overcome at least some of the drawbacks relating to the designs of prior infrared ray cooking appliances as discussed above. The invention is regarding to an infrared ray cooker, specifically, an infrared ray lamp applies infrared rays directly onto a rotatable pan in order to roast/cook food from above as well as penetrating into the middle of foods. At the same time, the upper infrared ray lamp heats the rotatable pan cooking foods from below. Therefore, neither the surface nor the interior of food items is burned or dried out, and the infrared grill does not produce any smoke. Foods are cooked evenly from top to bottom simultaneously. Furthermore, depending on the intended cooking needs of users, it is possible to change the disposition of the rotatable pan to accommodate one's needs easily. The infrared ray cooking appliance can be used either as a grill or as a boiler conveniently.

To attain the above object of the present invention, there is provided an infrared ray heat radiation cooker comprising:

a base stand at the center of the upper surface of which a shaft hole is formed, and on one side of which a power switch for controlling an electric power supply is formed;

a rotatable pan which is a circular plate style container which can contain food on the upper surface thereof, and at the center of the lower surface of which a shaft protrusion is formed so as to be detachably inserted into the shaft hole, to then be heated by infrared rays;

a supporting pillar which is vertically installed at one side of the base stand; and an infrared ray irradiator which is installed on the upper end of the supporting pillar and which is switched by the power switch, to thus apply infrared radiant heat onto the rotatable pan.

Preferably but not necessarily, a removable oil catching drawer is further provided in the base stand and an oil discharge outlet is axially formed in the shaft protrusion of the rotatable pan, in which oil is collected into the removable oil catching drawer throughout a cooking process through the oil discharge outlet of the rotatable pan.

Preferably but not necessarily, a rotating unit is further provided between the base stand and the rotatable pan in order to make the rotatable pan automatically rotate by the electric power supply.

Preferably but not necessarily, the supporting pillar comprises: a support member which is installed on one side of the base stand; a retractable pole which plays a role of adjusting height of the supporting pillar thereby enabling height mobility of the infrared ray rotatable pan; and a height control screw lever which is combined with the support member allowing a user to raise or lower height of the infrared ray irradiator as made mechanically possible by the retractable pole.

Preferably but not necessarily, the infrared ray irradiator comprises: a hood which is installed on the upper end of the supporting pillar; an infrared ray lamp which is installed inside the hood; an insulating panel which is installed on the inner surface of the hood; and a heat-resistant glass plate which is detachably installed at the lower portion of the infrared lamp.

BRIEF DESCRIPTION OF THE DRAWINGS

The above and/or other aspects of the present invention will become apparent and more readily appreciated from the fol

EXPLANATION OF MAIN PARTS OF THE DRAWINGS

| | |
|---|---|
| 10: Base stand | 11: Shaft hole |
| 12: Removable oil catching drawer | 13: Bearing |
| 20, 20': Rotating pan | |
| 21: Shaft protrusion | 22: Oil discharge outlet |
| 30: Supporting pillar | 31: Support member |
| 32: Retractable pole | 33: Piercing hole |
| 34: Height control screw lever | |
| 40: Infrared ray irradiator | 42: Hood |
| 43: Infrared ray lamp | 43: Heat insulator |
| 45: Heat-resistant glass plate | |
| 60: Rotating unit | 61: Motor |
| 62: Driving gear | 63: Following gear |
| 64: Chain | |

DETAILED DESCRIPTION OF THE INVENTION

Hereinbelow, an infrared ray cooker according to first to third embodiments of the present invention will be described with reference to the accompanying drawings, that is, FIGS. 1 through 4.

Figure 1:
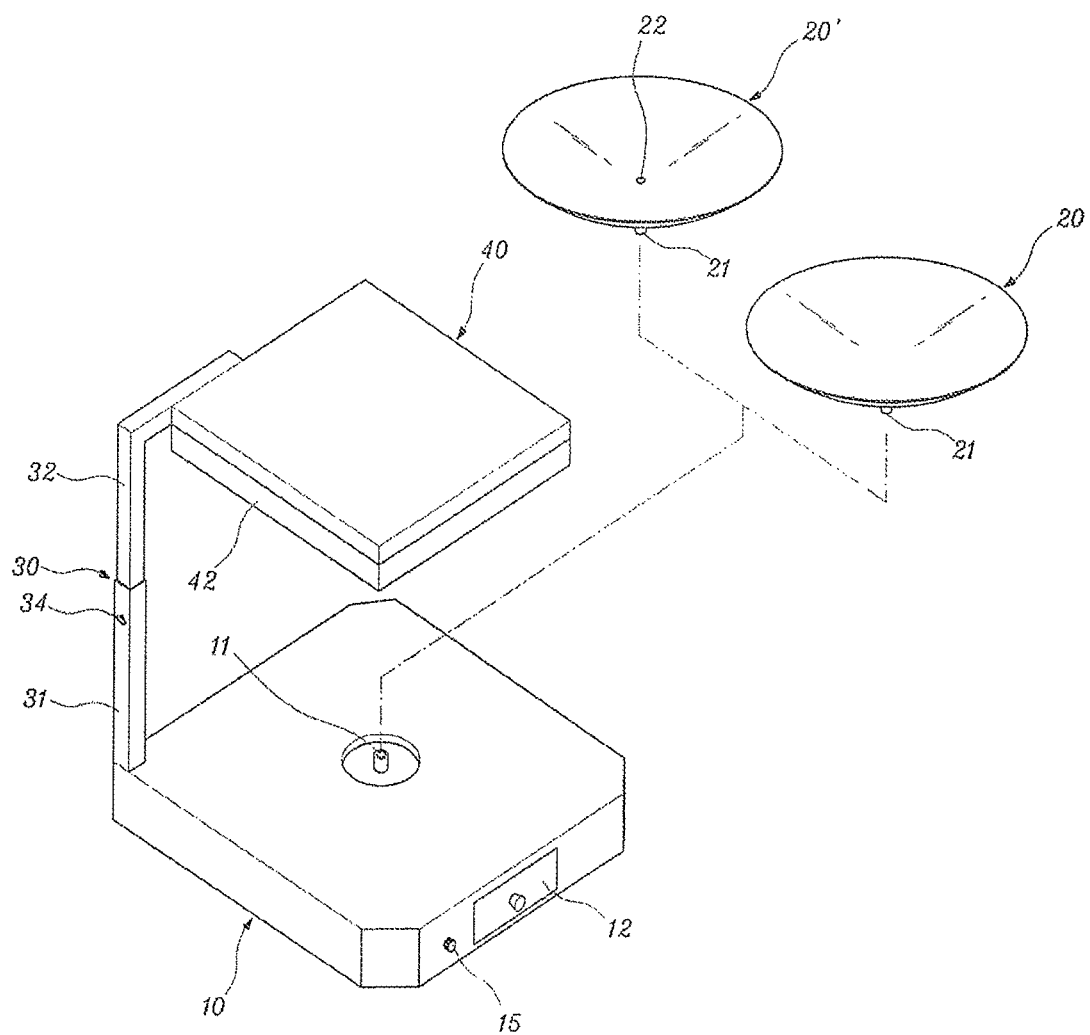
- FIG. 1 is a perspective view of an infrared ray cooker according to the present invention.
Figure 2:
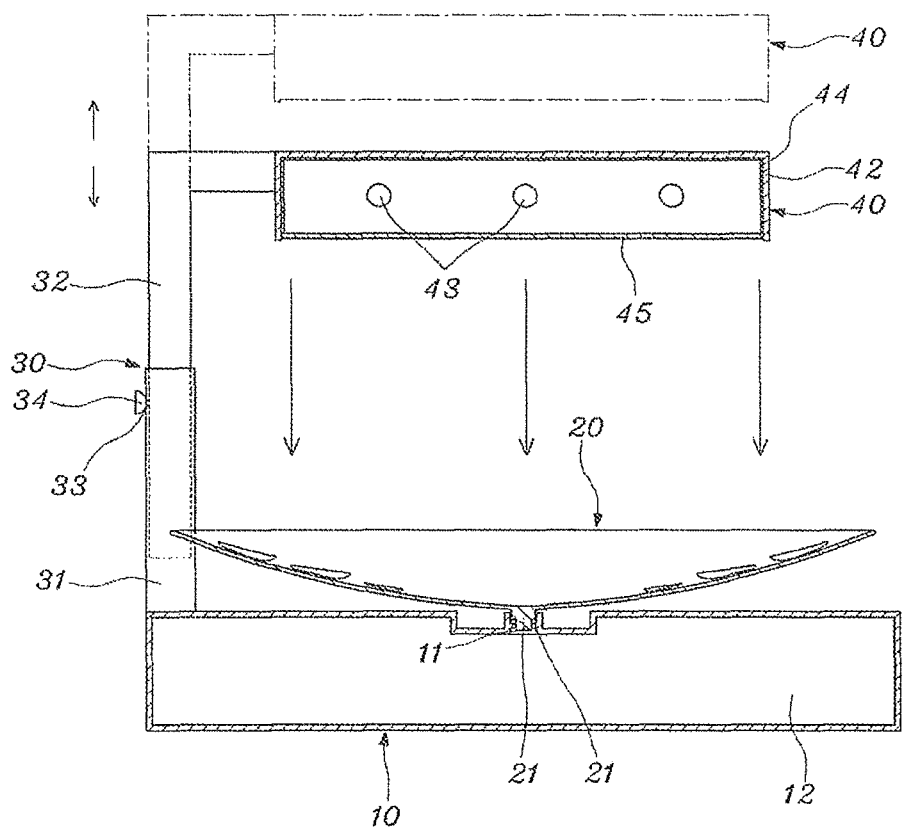
FIG. 2 is a cross-sectional view of an infrared ray cooker according to a first embodiment of the present invention.
Figure 3:
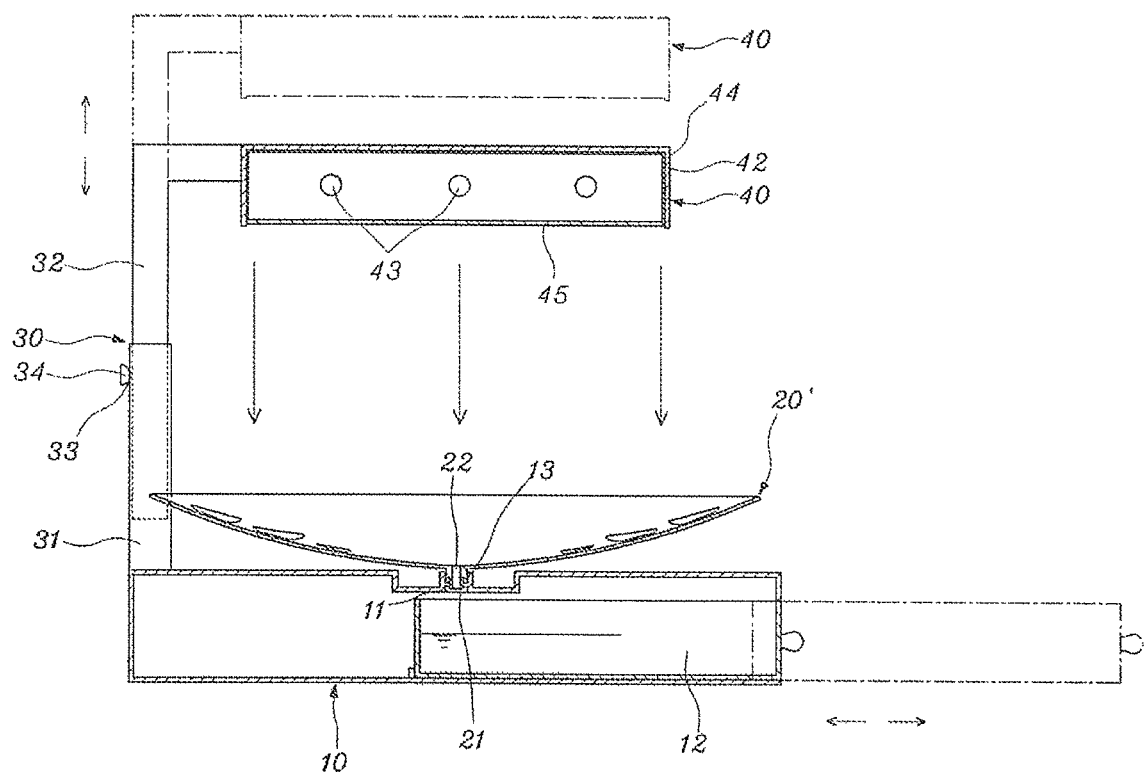
FIG. 3 is a cross-sectional view of an infrared ray cooker according to a second embodiment of the present invention.
Figure 4:
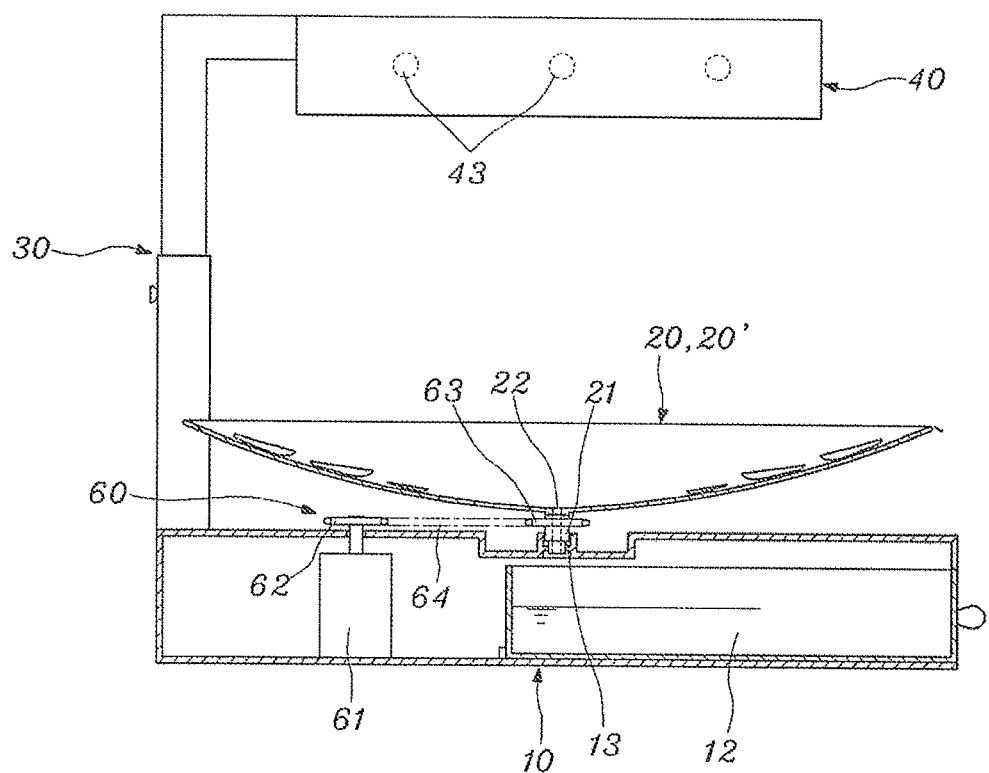
FIG. 4 is a cross-sectional view of an infrared ray cooker according to a third embodiment of the present invention.

FIG. 1 is a perspective view of an infrared ray cooker according to the present invention, FIG. 2 is a cross-sectional view of an infrared ray cooker according to a first embodiment of the present invention, FIG. 3 is a cross-sectional view of an infrared ray cooker according to a second embodiment of the present invention, and FIG. 4 is a cross-sectional view of an infrared ray cooker according to a third embodiment of the present invention.

As shown in FIG. 1, this invention has a base stand 10, a rotatable pan 20 or 20' set on the base stand 10, a supporting pillar 30 located at the center of the base stand 10, and an infrared ray irradiator 40 sitting upon the supporting pillar 30. The rotatable pan 20 or 20' can be used as a rotatable grill pan 20' for roasting fish or greasy meats or as a rotatable casserole pan 20 for boiling of Bulgogi which is one of the Korean traditional foods or stew.

The base stand 10 has adequate room for a shaft hole 11 at the center of the upper side, a power switch 15 on the side of main unit, and if it used as a grill, with the rotatable pan 20', it is equipped with a removable oil catching drawer 12 located inside the base stand 10 and under the shaft hole 11. The oil catching drawer 12 is a separate component that can be inserted or removed from one side of the base stand 10 as needed. The infrared ray irradiator 40 is powered by either plugging the base stand into an outlet or can be battery-operated as per user preference.

The rotatable pan 20 or 20' is a round plate upon which food is cooked and comes in two styles. The first a rotatable pan 20' and the second rotatable broiling casserole pan 20. As shown in FIG. 2, the rotatable main boiling casserole pan 20 is a shallow convex half-sphere which creates a shaft protrusion 21 at the center of the base stand and is detachable from the shaft hole 11. Additionally; as shown in FIG. 3, an oil discharge outlet 22 is located on the rotatable pan 20' which goes vertically through the rotatable pan 20' into a small shaft protrusion 21. And as explained above, when the present invention is used as a grill, with the rotatable pan 20', it is equipped with a removable oil catching drawer 12 inside of the base stand 10, and under the shaft hole 11, to collect any oil that is released in the cooking process.

The surface of the rotatable pan 20' may have an oil hole or non-stick coating embossing portion (not shown) to facilitate the evacuation of oil from the rotatable pan 20' into the discharge outlet. Teflon coating, which is the material that will be used as coating, is appropriate for the surface of the rotatable pan 20' to prevent burning or excessive browning of meat and fish.

The rotatable pan 20 or 20' from this invention will be installed on the base stand 10 to enable rotation of the pan during the cooking process. In order to this, a bearing 13 at the middle of the shaft hole 11 and a shaft protrusion 21 have been installed to facilitate this rotation. Rotating the pan 20 or 20' can be done manually by a user or, as shown in FIG. 4, it can be built with a rotational unit 60 to mechanically spin the pan 20 electrically.

As shown in FIG. 4, the rotating unit 60 can be installed inside of the base stand 10. The rotating unit 60 consists of the following; a driving gear 62 connected to an electric motor 61, a following gear 63 installed around the shaft protrusion 21, and a chain 64 to connect the driving gear 62 and the following gear 63. However, the rotating unit is not limited to the case shown in FIG. 4.

Another feature of the present invention is the supporting pillar 30 installed vertically into the base stand 10 which serves a height adjustment function. As shown in FIG. 3, the supporting pillar 30 consists of the following: a supporting member 31 located at one side of the base stand 10, a retractable pole 32 providing a mechanical means for users to raise and lower the infrared ray irradiator height as needed, and a height control screw lever 34 fastened to the retractable pole 32 with a screw from a piercing hole 33 on the supporting member 31, which enables users to adjust the infrared ray irradiator height before, during and after cooking.

The structure of a supporting pillar 30 for this present invention could be modified to accommodate various height control possibilities. For example, if a rack gear is installed on one side of a retractable pole 32 and pinion gear is installed on the height control lever 34; then these two gears interlock smoothly each other. And, what is more, if the pinion gear was connected to a motor (not shown), then automatic height control would be made possible.

The infrared ray irradiator 40 is installed upon the supporting pillar 30 and an infrared lamp 43, emitting infrared radiant heat, is installed angled towards the rotatable pan 20. Detailed structure of the infrared ray irradiator consists of the following: a hood 42 for an infrared ray lamp 43, the infrared ray lamp 43, a heat insulator 44 between the hood 42 and the infrared ray lamp 43, and a heat-resistant glass plate 45 detachable from the underside of the hood 42.

The hood 42 gathers infrared rays applied from infrared lamp 43 and directs it towards the rotatable pan 20. One infrared lamp alone can use any of far-infrared radiation or near-infrared radiation; however, two 500 W near-infrared ray bulbs are best suited for cooking with the present invention. The infrared lamp 43 intensity can be controlled by the power switch 15 on the base stand 10, which is also the temperature control switch 15.

The heat insulator 44 prevents the dispersion of infrared radiant heat from the infrared ray lamp 43 and functionally blocks against dispersion and simultaneously reflects it towards foods on the rotatable pan 20. A heat-resistant glass plate prevents the contamination of the infrared lamp 43 from oil splatters from the food being cooked. In addition, the heat-resistant glass plate magnifies the intensity of infrared radiant heat directed at the rotatable pan 20 from the infrared ray lamp 43 while making the grill more comfortable visually for users by containing the light dissemination from sight.

The above explanations exemplify the practical applications for this product but the scope of this invention is not limited to the above explanations and examples. The inventor might amplify the scope and purpose of the present invention, and modify the component factors of the invention, specially changing of structure of a base stand 10, the rotatable pan 20 or 20', the supporting pillar 30 and the infrared ray irradiator 40. As long as changes made to the design don't bring about unexpected results outside the scope of the invention or radically change the functionality of the invention, they should be accepted as within the rights of the inventor and the invention.

The present infrared radiation cooker emits radiant heat from an infrared ray lamp above directly onto the rotatable pan in order to cook food on both sides simultaneously by heating the rotatable pan directly, with the infrared ray lamp, which allows for food to be cooked on bottom as well as being directly heated by the infrared rays on top. This dual cooking method exhibits high thermal efficiency and cooks food evenly without burning.

Additionally, the infrared radiation cooker from the present invention has a rotatable pan which enables it to serve as a both a broiler and a rotatable grill. Food can cooked to a broiled, boiled, grilled or roasted state all with the same grilling unit. Some examples of the diverse purposes for which the grill has been used are; roasting fish, grilling steaks, and also boiling meats for Bulgogi or stew.

Finally, this infrared radiation cooker can be easily adjusted to suit user's needs; particularly by controlling the infrared ray lamp height and heat intensity, modifying the temperature setting of the infrared ray fan, and spinning the main rotatable grill pan automatically or manually. When roasting foods or cooking greasier meats, the base stand also contains an oil catching drawer to reduce mess and facilitate an easy clean up. The infrared radiation cooker suits both commercial and residential use as it can accommodate users in whatever their cooking needs should be.

The present invention is not limited to the above-described embodiments. It is apparent to one who has an ordinary skill in the art that there may be many modifications and variations within the same technical spirit of the invention.

What is claimed is:

1. An infrared ray heat radiation cooker comprising:
   a base stand at the center of the upper surface of which a shaft hole is formed, and on one side of which a power switch for controlling an electric power supply is formed;
   a rotatable pan which is a circular plate style container which is uniformly arcuate in cross-section and can contain food on the upper surface thereof to be heated by infrared rays, and at the center of the lower surface of which a shaft protrusion is formed to be detachably inserted into the shaft hole, to support the rotatable pan on the base stand when detachably inserted into the shaft hole, and to enable rotation of the rotatable pan relative to the base stand when detachably inserted into the shaft hole;
   a supporting pillar which is vertically installed at one side of the base stand; and
   an infrared ray irradiator which is installed on the upper end of the supporting pillar and which is switched by the power switch, to thus apply infrared radiant heat onto the rotatable pan said infrared ray irradiator comprising a hood having an upper surface and surrounding sidewalls that extend downward from said upper surface and a lower heat resistant glass plate extending substantially parallel to said upper surface for enclosing said hood and at least one infrared lamp operably positioned within said hood for directing infrared radiation toward said rotatable pan and said upper surface of said hood and said side wall of said hood being covered with a heat insulator layer between said hood and said at least one infrared ray lamp.

2. The infrared ray heat radiation cooker according to claim 1, wherein a removable oil catching drawer is further provided in the base stand and an oil discharge outlet is axially formed in the shaft protrusion of the rotatable pan having an arcuate cross-section, in which oil is collected into the removable oil catching drawer throughout a cooking process through the oil discharge outlet of the rotatable pan and through the shaft hole of the base stand.

3. The infrared ray heat radiation cooker according to claim 1 or 2, wherein a rotating unit is further provided between the base stand and the rotatable pan in order to make the rotatable pan automatically rotate by the electric power supply.

4. The infrared ray heat radiation cooker according to claim 1 or 2, wherein the supporting pillar comprises:
   a support member which is installed on one side of the base stand;
   a retractable pole which plays a role of adjusting height of the supporting pillar thereby enabling height mobility of the infrared ray rotatable pan; and
   a height control screw lever which is combined with the support member allowing a user to raise or lower height of the infrared ray irradiator as made mechanically possible by the retractable pole.

* * * * *